US 9,864,645 B2

United States Patent
Finnigan et al.

(10) Patent No.: US 9,864,645 B2
(45) Date of Patent: *Jan. 9, 2018

(54) EXCEPTION WRAPPING SYSTEM

(71) Applicant: Home Box Office, Inc., New York, NY (US)

(72) Inventors: Patrick Finnigan, Seattle, WA (US); Brendan Joseph Clark, Seattle, WA (US); Brandon C. Furtwangler, Issaquah, WA (US); Steven N. Furtwangler, Okemos, MI (US)

(73) Assignee: HOME BOX OFFICE, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/439,745

(22) Filed: Feb. 22, 2017

(65) Prior Publication Data

US 2017/0161134 A1    Jun. 8, 2017

Related U.S. Application Data

(63) Continuation of application No. 14/805,087, filed on Jul. 21, 2015.

(Continued)

(51) Int. Cl.
    *G06F 11/00* (2006.01)
    *G06F 11/07* (2006.01)
(Continued)

(52) U.S. Cl.
    CPC ........ *G06F 11/0718* (2013.01); *G06F 9/4812* (2013.01); *G06F 11/079* (2013.01);
    (Continued)

(58) Field of Classification Search
    CPC . G06F 11/0772; G06F 11/0793; G06F 11/366
    See application file for complete search history.

(56) References Cited

U.S. PATENT DOCUMENTS

| 7,962,961 B1 * | 6/2011 | Griffin | G06F 21/566 |
| | | | 709/224 |
| 2005/0246269 A1 | 11/2005 | Smith | |

(Continued)

OTHER PUBLICATIONS

International Search Report and Written opinion from International Patent Application Serial No. PCT/US15/41603, dated Nov. 26, 2015, 23 pages.

(Continued)

*Primary Examiner* — Charles Ehne
(74) *Attorney, Agent, or Firm* — Amin, Turocy & Watson, LLP

(57) ABSTRACT

The described technology is directed towards handling errors in an application program that allows for a taxonomy and precedence order of errors. Exception wrapping includes preserving relevant information with an exception, and consolidates a series of errors into a single dominant exception instance that is handled appropriately depending on the exception type. Also described is a centralized exception manager that outputs an interactive dialog based upon the exception type, and takes a recovery action based upon user interaction with the dialog.

20 Claims, 11 Drawing Sheets

Related U.S. Application Data

(60) Provisional application No. 62/028,378, filed on Jul. 24, 2014.

(51) Int. Cl.
*G06F 11/36* (2006.01)
*G06F 9/48* (2006.01)
*G06F 9/44* (2006.01)

(52) U.S. Cl.
CPC ...... *G06F 11/0751* (2013.01); *G06F 11/0769* (2013.01); *G06F 11/0772* (2013.01); *G06F 11/0781* (2013.01); *G06F 11/0793* (2013.01); *G06F 11/366* (2013.01); *G06F 8/315* (2013.01); *G06F 2209/481* (2013.01)

(56) References Cited

U.S. PATENT DOCUMENTS

| | | | |
|---|---|---|---|
| 2008/0271007 A1 | 10/2008 | Gou | |
| 2009/0293073 A1* | 11/2009 | Nathan | G06F 9/547 719/328 |
| 2010/0235613 A1 | 9/2010 | Baldwin | |
| 2010/0269091 A1 | 10/2010 | Barnes et al. | |
| 2011/0138476 A1* | 6/2011 | Black | G06F 9/468 726/27 |
| 2012/0084754 A1* | 4/2012 | Ziegler | G06F 11/3696 717/124 |
| 2013/0254740 A1* | 9/2013 | Swaminathan | G06F 8/20 717/105 |
| 2014/0040860 A1 | 2/2014 | Darcy et al. | |
| 2014/0068573 A1 | 3/2014 | Brewis et al. | |

OTHER PUBLICATIONS

Anonymous: Jon Skeet's coding blog: "Sheer Evil: Rethrowing exceptions in Java," Apr. 3, 2007, 6 pages.
Anonymous: "Explaining JavaIs error handling system," Mar. 5, 2014, 10 pages.
Ink et al "Java Exception Handling: Exception Hierarchies," Apr. 27, 2014, 4 pages.
Anonymous: "Java Exception Handling: Exception Wrapping," Jun. 22, 2012, 2pages.
Anonymous: "Java Exception Handling: Exception Enrichment in Java," Sep. 5, 2012, 8 pages.
Non-Final Office Action for U.S. Appl. No. 14/805,087, dated Dec. 1, 2016, 19 pages.

* cited by examiner

EXCEPTION WRAPPING SYSTEM

CROSS-REFERENCE TO RELATED APPLICATION

The present application is a continuation of U.S. patent application Ser. No. 14/805,087, filed Jul. 21, 2015, which claims priority to U.S. provisional patent application Ser. No. 62/028,378, filed Jul. 24, 2014. The entireties of these applications are incorporated by reference herein.

BACKGROUND

Encountering a series of errors (failures) is common in computer program code. A series of errors may occur when some original error leads to subsequent failures. This can occur in synchronous code if the original error is caught and re-thrown. This can also occur in asynchronous code if an asynchronous routine fails and thus causes handlers hooked into that asynchronous routine's completion to fail as well.

Many programming languages like JavaScript® provide some built-in functionality for error handling. For example, JavaScript® provides the Error type and try and catch statements, which facilitate the throwing of an Error instance. While very useful in many instances, with a complex series of errors the built-in error handling functionality is often insufficient for diagnosing a problem and surfacing it correctly to the end user.

For example, if one function call fails (due to a bug or exceptional condition), then a series of functions and components may fail. It is often not clear which failure in this chain of failures should take precedence and be shown to the end user. Additionally, the initial error that caused the series of errors and the asynchronous call graph (failure chain/graph) can be difficult to determine.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein provides a mechanism of determining error precedence and of preserving contextual data captured for each failure, including each failure in a chain of failures. For example, an error may be explicitly thrown by application program code (e.g. due to unexpected state), an error may arise from a function call to an external component, or an error may be generated by the runtime (e.g. due to a code bug).

An exception wrapping system as described herein presents an extensible Exception type that can wrap the thrown error to capture additional run-time context. The exception wrapping system also provides a derived exception type hierarchy that can be used to determine precedence for a chain of wrapped exception instances. The resulting highest-precedence exception instance may be routed to an exception manager, which determines how to handle the resulting exception, which may include what to display to the user (e.g., an interactive dialog that is relevant to the error) and optionally what recovery action or actions to take.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards a wrapped exception handling technology, including an architecture for handling program errors that allows for a taxonomy and precedence order of errors. In general, a captured error is wrapped as an exception instance with contextual information relevant to the error. In one or more implementations, the wrapped information is maintained in properties of an Exception object instance. An exception manager obtains the exception, e.g., the Exception object instance and its information. The exception manager is able to provide a dialog to the user regarding the type of error, which forces the user to interact with that dialog and choose a recovery action in order to continue using the program.

As will be understood, one or more aspects of the wrapped exception handling technology are directed to trying to surface the most relevant error when a series of errors is encountered. Exception wrapping as described herein is able to consolidate the series of errors into a single dominant exception instance that can be handled appropriately, depending on the exception.

It should be understood that any of the examples herein are non-limiting. For instance, some of the examples are based upon JavaScript®, however these are only examples, and the technology described herein may be used with other programming languages. As another example, some of the error examples are directed towards a video streaming application program and its associated service providers, however the technology applies to any computer program. Still further, an entertainment/game console is one example computing environment, however any other suitable computer-based device such as a personal computer, tablet device, mobile computer device and the like may implement the technology described herein. As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used in various ways that provide benefits and advantages in computing and error handling in general.

Figure 1:
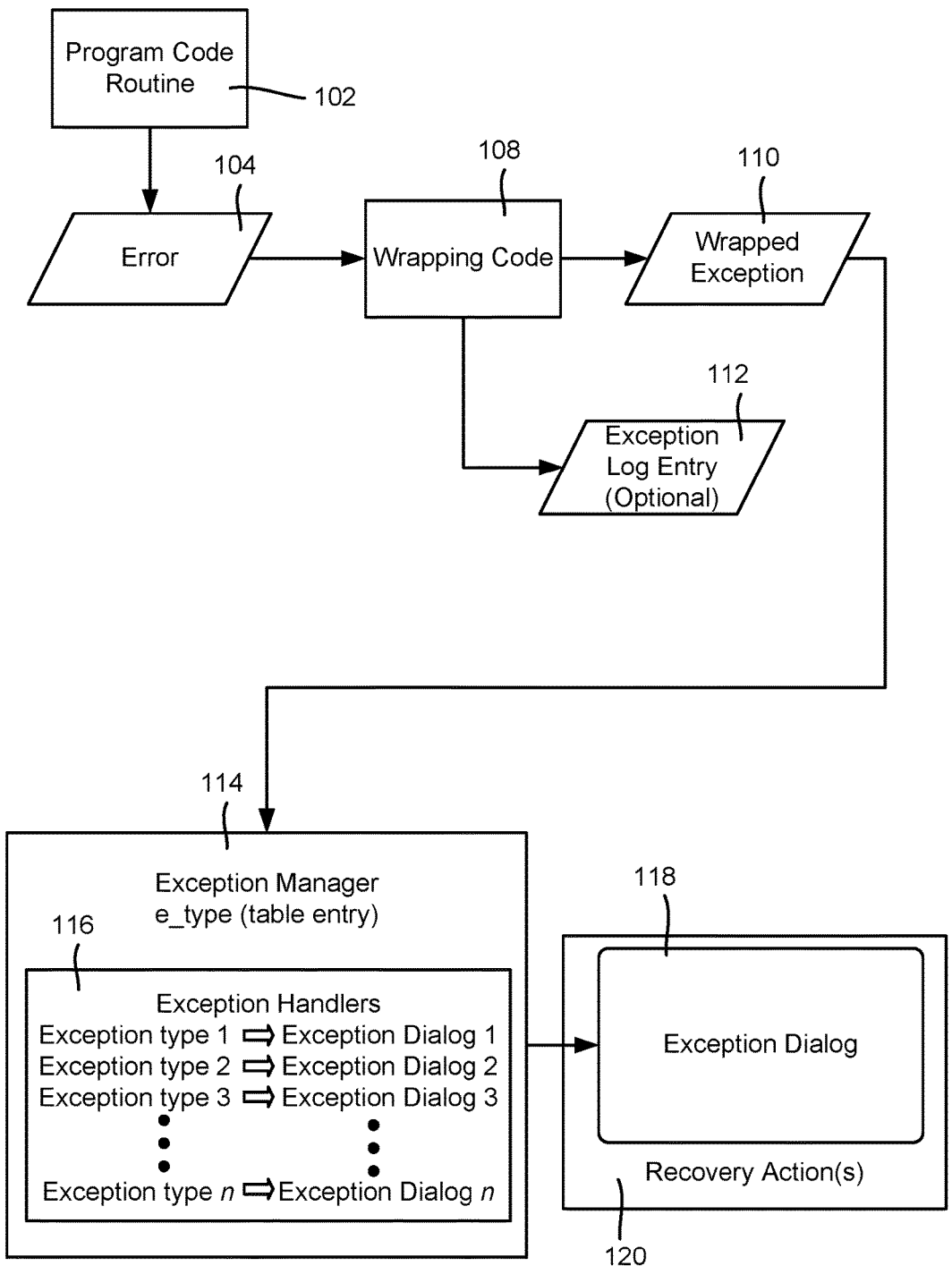
FIG. 1 is an example block diagram of various example components for implementing a wrapped exception handling system according to one or more example implementations.

FIG. 1 is a generalized block diagram showing example aspects of the technology described herein. In general, program code includes a routine 102 or the like that throws an error 104 under some condition. As described above, as some non-limiting examples of errors, an error may be explicitly thrown by application program code (e.g. due to unexpected state), an error may arise from a function call to an external component, or an error may be generated by the runtime (e.g. due to a code bug). An error processing component, referred to herein as wrapping code 108, receives the error and processes it as described herein. In the exemplified implementation, this typically includes having the error 104 wrapped into an exception instance 110 and ultimately sent to an exception manager, e.g., a centralized exception manager.

To this end, as described herein, the wrapping code 108 (e.g., also generally referred to as Exception.wrap) wraps the error with relevant information, and outputs a wrapped exception 110. In one or more implementations, the wrapped exception 110 is in the form of an Exception object instance having properties that contain relevant information regarding the error. The wrapping code 108 (or other suitable component) optionally may output exception-related information as a log entry 112 or the like, e.g., an entry indicating that an exception instance was encountered, for debugging or other analysis purposes. For example, the resulting wrapped exception instance that is returned from Exception.wrap( ) normally contains contextual data about the series of failures that is sufficient to be able to diagnose the original issue and also reconstruct the failure chain/graph.

The wrapped exception 110 is (typically) routed to an exception manager 114. Among its operations, the exception manager 114 accesses a table of handlers 116, in which each handler comprises a mapping between an exception type and a corresponding dialog; (in FIG. 1 the exemplified dialog 118 includes one or more recovery actions). The exception manager 114 thereby outputs a corresponding dialog 118 to the user, which includes one or more recovery actions 120. An example of one suitable exception type table is shown below.

The dialog 118 also resumes the program at an appropriate location depending on the type of exception and (typically) the user input to the dialog 118. Note that in one or more implementations, user input may be needed, even for a default recovery action; a reasonable default choice of recovery action is restarting the application, which is likely the safest/most likely to succeed recovery action if a more isolated recovery action cannot be determined. However in other implementations, there may not be a handler/dialog mapping for one or more of the exception types, in which event the exception manager 112 (if such an exception is not otherwise already handled) along with the corresponding handler for that exception takes an appropriate default recovery action without user input.

With respect to one or more example implementations, as used herein, a "base" Exception type is a type definition that includes functionality for the wrapped exception handling system. As a generic base type, the base Exception type does not define specific errors or error precedence—derived exception types are used for this purpose (e.g., derived in the sense of OOP [Object-Oriented Programming] inheritance). In one or more implementations, a base Exception type needs to be included in the root namespace or module so it can be used system-wide.

In one or more implementations, the base Exception type includes the following attributes:
ID: a UUID (universally unique identifier)
Message: an internal developer message to diagnose the cause of the Exception
Callstack: the function execution stack at the time the Exception instance is created
Area: (optional) the area in the program where the exception occurred; often provides more specific guidance than Callstack.
Contextual Data: (optional) arbitrary data that may help in debugging, e.g., values of variables at the time of the exception, property values and so on.

The Exception type may derive from a built-in error type definition in the target programming language if one exists and can be derived therefrom. For example, in JavaScript® the Exception type derives from the built-in JavaScript® Error type. Note that the Message property in the Exception type maps to the JavaScript® Error message, and Callstack also is part of JavaScript®; (however, errors are not necessarily thrown by JavaScript® and instead may be passed via some other mechanism, e.g., a JavaScript® Promise rejection. Thus, without wrapping, Callstack is not always provided; however via wrapping the Callstack property is provided even if an error is not thrown). Deriving from the built-in Error type definition allows built-in machinery in the language runtime to treat Exception object instances as native error instances (so, for example, they can be caught and thrown). For example, in FIG. 3, program code that creates an object may use "try" and "catch" statements to throw an Exception object instance using built-in JavaScript® functionality. Similarly, a dispatcher 331 may throw an error via "try" and "catch" statements:

```
routine( ) {
// async dispatcher loop through work items - e.g., per frame loop
    try {
        // run work item (i.e. the program code routine 102 in FIG. 1)
        ...;
        ...;
    }
    catch (reason) {
        var e = Exception.wrap(reason, {
            message: "example message",
            area: "example area"});
        ExceptionManager.handle(e);
    }
}
```

An exception also may be created if an asynchronous callback fails. For example, if a JavaScript® Promise fails, the failure may be transformed into an exception instance using wrapping code that captures the Callstack and other information. From there, in one or more implementations, the exception manager 114 maps exception instance types to error dialogs/pages, and does not ignore or pass on errors; (however in alternative implementations, an exception manager may choose to ignore an exception, throw a different exception, pass the exception on to another entity, and so forth). Note that, for example, the exception manager may use the asynchronous dispatcher for dispatching its asynchronous work items, and thus handling the error in the exception manager instead of halting the asynchronous dispatcher allows the exception manager to continue operating to provide the user dialog, and the like.

Moreover, in one or more implementations, the design is such that the decision to ignore an error typically does not occur in the exception manager, because the exception manager is the final destination for unhandled errors. Instead, failures eventually are routed to the exception manager unless they are explicitly caught and ignored (e.g., by a "catch" statement or Promise rejection handler). For example, sometimes expected but non-critical failures are caught and ignored. As a more particular example, if an image fails to load, the system wants to catch that failure earlier, instead of letting it bubble/route to the exception manager. If allowed to route to the exception manager, without a plan for ignoring it at the exception manager, the failure may cause problems, e.g., if loading the image was part of some larger work item such as loading the page, the larger work item gets aborted as soon as the error is thrown. Therefore, the system is designed to catch and ignore expected errors, rather than relying on the exception manager to ignore such errors.

Derived exception types are used to specify the nature of specific exceptions. Derived exception types are type definitions that derive from the Exception base type and can form their own type hierarchies. In general, the exception wrapping system gives precedence to a more derived type over a base one, as each level in the hierarchy provides more specific information.

Figure 2:
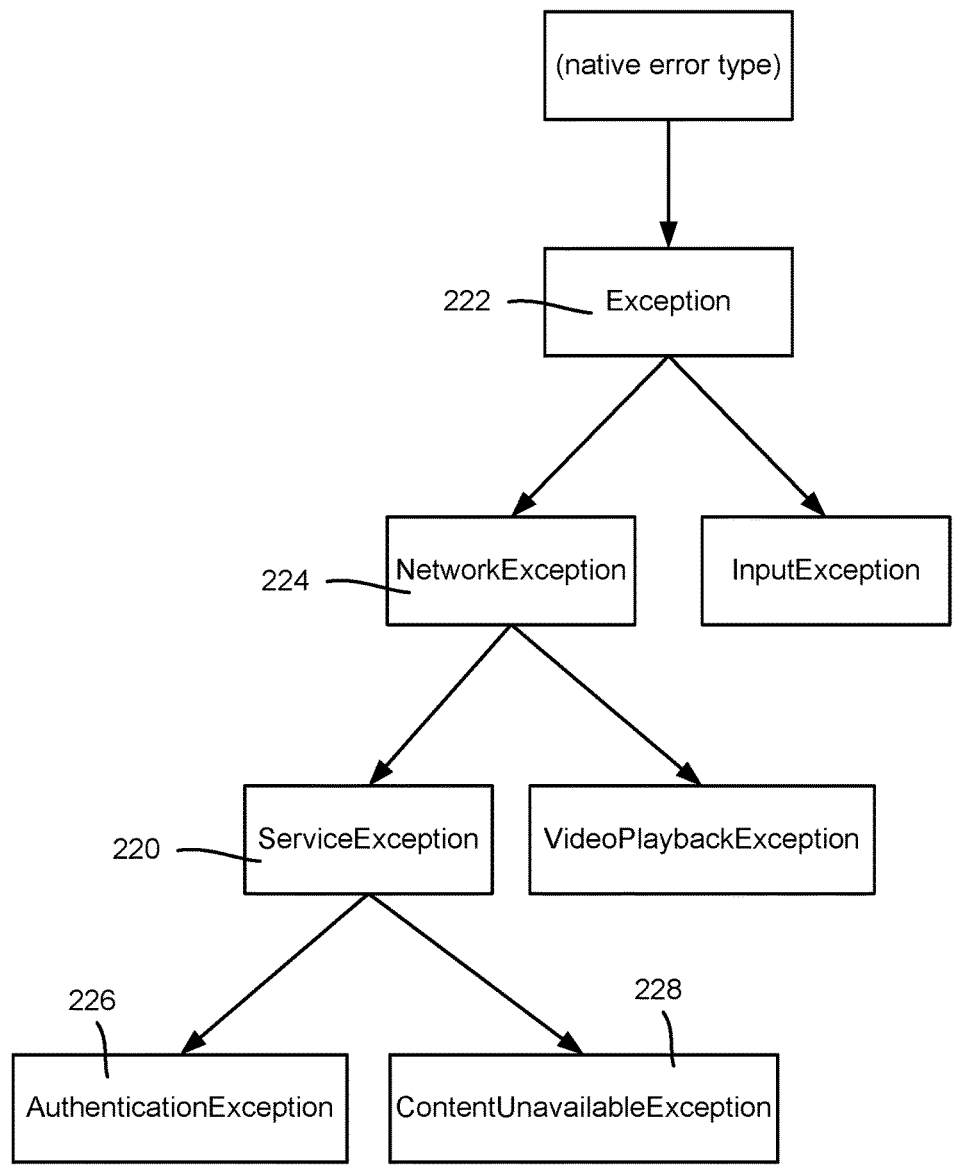
FIG. 2 is a representation of an example hierarchy of derived exception types, according to one or more example implementations.

By way of example, as generally represented in the hierarchy (taxonomy) of FIG. 2, ServiceException 220 may derive from NetworkException 224 which in turn derives from the Exception base type (e.g., Exception 222), and AuthenticationException 226 and ContentUnavailableException 228 may each derive from the ServiceException 220 type. The ContentUnavailableException 228 indicates a more specific nature of failure, e.g. that a particular requested asset (e.g. a video instance) is not available on the server, within the class of ServiceExceptions. This more specific type allows the exception manager 114 (FIG. 1) to provide a more specific dialog to the user, as well as provides more information for use in debugging, analytics, and logging.

Derived exception types can be included in sub-namespaces or modules depending on the nature of the exception type. For example, ServiceException can be included in a dataservices namespace and module because it is only originated in data service code.

Figure 3:
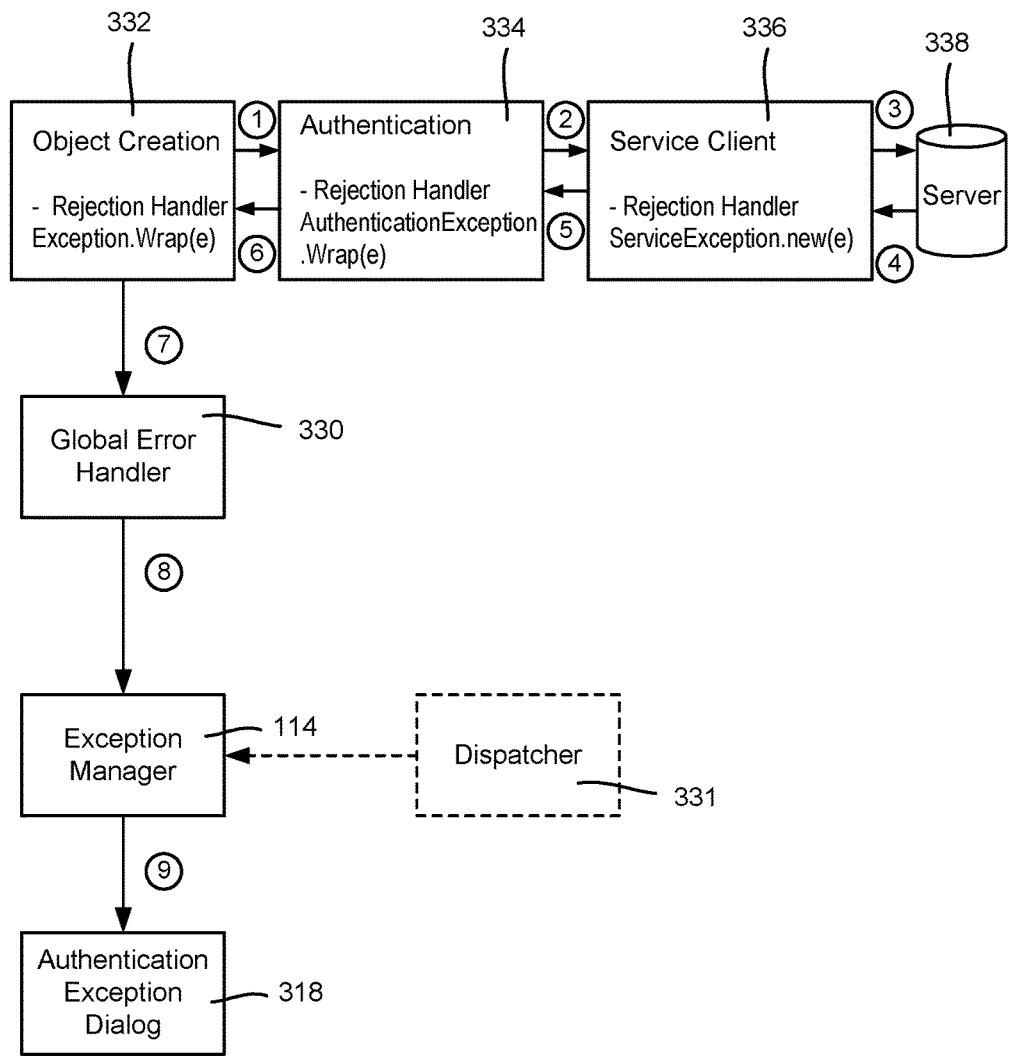
FIG. 3 is block diagram and data flow diagram representing how an error causes an exception to propagate through a wrapped exception handling system, according to one or more example implementations.

In one or more implementations, the exception manager 114 is a central handling mechanism for different exception types. Exceptions get routed to the exception manager 114, such as via a global error handler 330 (FIG. 3). Note that in applications (e.g., in JavaScript® or other) it is often possible to register a global (central) error handler, which is a central hook to catch and handle unhandled errors in the application. For this system, a global error handler 330 is added to the application (or "process") that calls Exception.wrap(e) (for an unhandled error "e") and sends the result to the exception manager 114.

In such an implementation, the exception manager 114 may implement a singleton pattern because only one exception manager instance is needed in the running application. The exception manager 114 may include a hook to which exceptions can be passed for handling and a mapping of exception types to handlers. Because exception types may be declared across different modules, the exception manager 114 may be defined on a top layer that sits above these other modules.

The exception manager 114 maps different exception types to handlers 116. Generally, each handler results in showing information (e.g. by showing a message dialog) to the user indicating the nature of the exception and provides an interactive input mechanism, such as one or more buttons with paired recovery actions. In the event that a base Exception object instance or native error occurs that was never wrapped in a derived exception type, the base Exception type/native error maps to a generic exception dialog that is then used.

The wrapping code 108 and exception manager 114 thus handle exceptions, including preventing (to a high probability) the possibility of any unhandled error crashing the application. The exception manager 114 also handles and ignores new incoming exceptions while exception information is currently being shown to the user and before the user has selected a recovery action.

Figure 4:
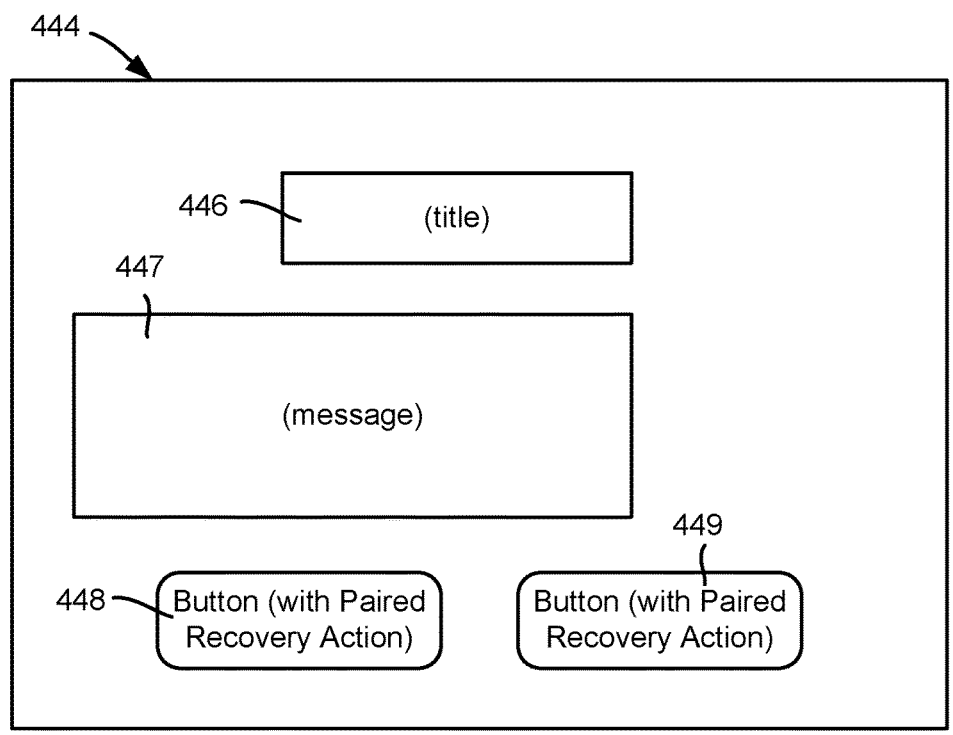
FIG. 4 is a representation of an example generalized dialog template, according to one or more example implementations.

Exception dialogs are modal message dialogs describing the nature of a specific exception type, as generally represented in the general example dialog template 444 of FIG. 4; (note however that exception dialogs are just one option for handling exceptions in the exception manager). In one or more implementations, each dialog includes a title 446, message 447, and set of buttons 448, 449 each with a paired recovery action (there is typically at least one button with a paired recovery action). In this example, exception dialogs are not dismissible except through such a button—the user has no other way of closing the exception dialog, e.g., there is no close button and no light-dismiss capability, whereby the user is forced to acknowledge the exception and take a recovery action by clicking on a button.

The following exception type table is one example of how each exception type, dialog, button and action may be associated with one another for a video streaming application program:

| Exception Type | Exception Dialog Title | Exception Dialog Message | Exception Dialog Buttons | Description |
| --- | --- | --- | --- | --- |
| Activation Exception | "Activation Error" | "Activation failed. Please try again later." | "Ok": Navigate back | Unexpected bad response from activation service |
| Authentication Exception | "Authentication Error" | "There was a problem with HBO GO ® authentication. Please try again. If the problem persists, try reactivating your Console for HBO GO ®." | "Retry": Retry login "Reactivate": Navigate to activation page | Login failure |

| Exception Type | Exception Dialog Title | Exception Dialog Message | Exception Dialog Buttons | Description |
|---|---|---|---|---|
| ContentUnavailableException | "Content Unavailable" | "The requested item is no longer available." | "Ok": Navigate back | Item out of catalog |
| NetworkException | "Network Error" | "Please try again in a few minutes. HBO GO ® will now restart." | "Restart" (or "Ok"): Restart app | Generic network request failure |
| PlaybackException | "Video Error" | "We're having trouble playing this video right now." | "Go Back" (or "Ok"): Navigate back | Error starting video or during video streaming |
| PinException | "Pinning Error" | "The pin operation could not be completed." | "Ok": Dismiss the dialog | XBOX pin system API failure |
| Reactivation Required Exception | "Reactivation Required" | "Your activation information is no longer valid. Your Xbox One must be reactivated." | "Ok": Navigate to activation page | Authentication service indicates reactivation is required or authentication succeeds but no activation records are found |
| ServiceException, ServiceError CodeException | "Service Error" | "Please try again in a few minutes. HBO GO ® will now restart." | "Ok": Restart app | HBO service returned invalid or no response |
| Exception | "Error" | "An application error has occurred. HBO GO ® will now restart." | "Ok": Restart app | Generic dialog for unexpected app error (e.g. code bug) |
| ActivationTimeout Exception | "Activation Timeout" | "Activation timed out due to lack of activity. Please try again." | "Ok": Dismiss dialog and refresh activation page with new code | Activation timeout |
| GOSTException | "Too Many Devices in Use" | "You have exceeded the maximum number of simultaneous devices for your HBO GO ® account. To use HBO GO ® on your Xbox One, please stop watching HBO GO ® on one of the other devices currently in use." | "Ok": Navigate back | Simultaneous stream limit exceeded |
| "ContentRestricted Exception" | "Content Locked" | "Access to this content is locked due to your {AFFILIATE} account's Parental Controls settings. Check your {AFFILIATE} settings or contact {AFFILIATE} for more information." | "Ok": Navigate back | Attempt to play content restricted by affiliate. |

Figure 5:
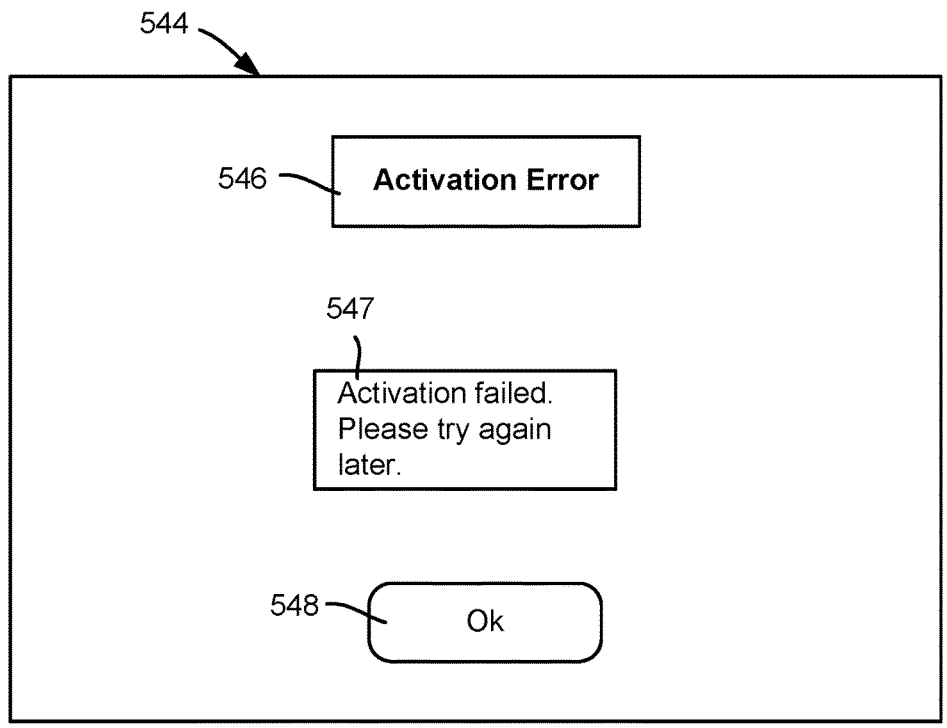
FIGS. 5-8 are representations of example information related to an exception type that may appear in a dialog, according to one or more example implementations.
Figure 6:
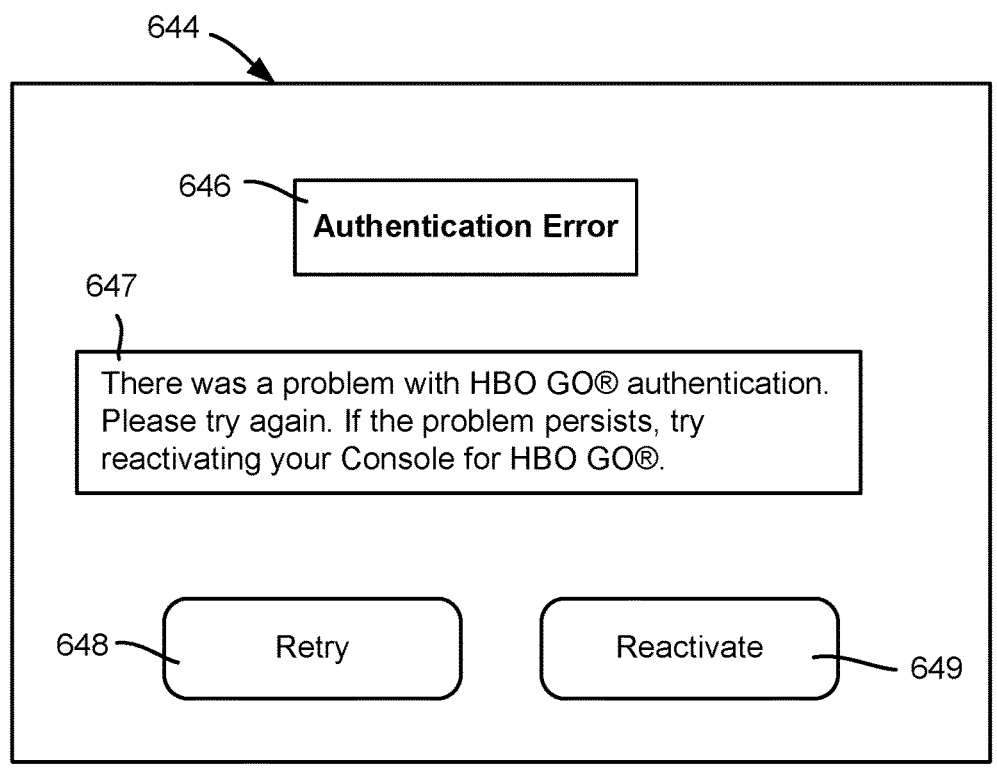

FIG. 5 (ActivationException) and FIG. 6 (Authentication-Exception) show how the title 546, 646, description 547, 647 and button fields 548, 648 and 649 may be rendered based upon this table for the first two exceptions listed therein. Note that FIGS. 5 and 6 (and similarly FIGS. 7 and 8) are merely for purposes of illustration, and are not intended to be accurate representations of actual dialogs.

Figure 7:
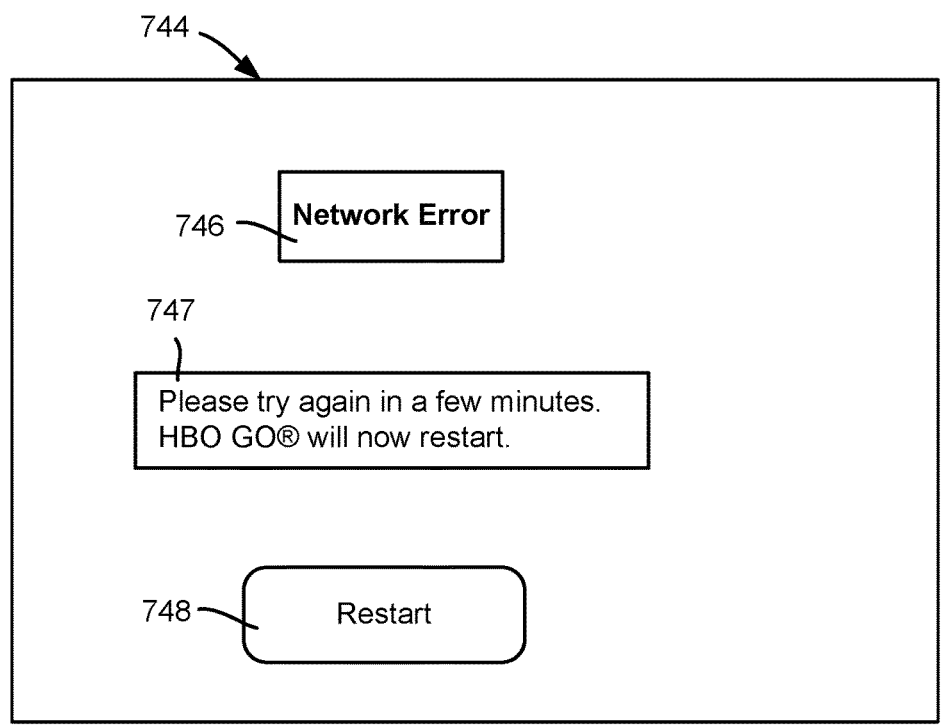
Figure 8:
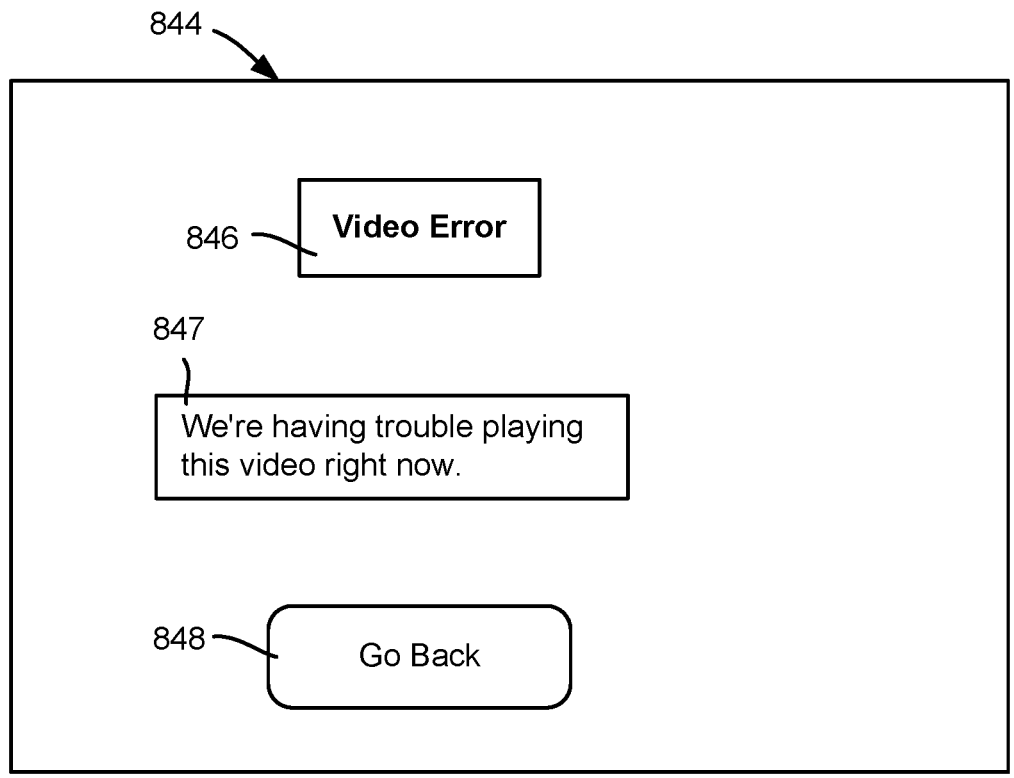

For exceptions deemed severe (e.g., a NetworkException indicating that internet connection has been disrupted as in FIG. 7), the exception manager may define only one recovery action that restarts the application and pair this with a button 748 showing "Restart" text. For exceptions deemed less severe (e.g. PlaybackException), the exception manager may define only one recovery action that simply navigates back to the previous page and pairs this with a button 848 (FIG. 8) showing "Go Back" text.

Exception wrapping is a mechanism that enforces exception precedence and transforms a series of errors into a single exception instance that eventually gets passed to the exception manager for handling. By way of example, in a series of errors, consider the initial point of failure (e.g., error "origination"). This may be a native error thrown explicitly by a developer's code, an error generated by the language runtime when it encounters problematic code, or an exception instance of any derived exception type or the base Exception type that is created and thrown explicitly. Note that this list is not exhaustive, e.g., an error may be thrown by an included library's code, or an error may be caused by an unhandled JavaScript® Promise rejection as other examples.

A series of errors may occur when the original (origination) error leads to subsequent failures. This can occur in synchronous code if the original error is caught and re-thrown. This can also occur in asynchronous code if an asynchronous routine fails and thus causes handlers hooked into that asynchronous routine's completion to fail as well.

In the synchronous case, when the original error is caught it can be wrapped before it is re-thrown. Wrapping allows optionally modifying the exception properties and type before it is re-thrown.

In the asynchronous case, the original asynchronous routine indicates it failed and optionally may provide the Error instance that caused it to fail. The code that hooked that asynchronous routine has the opportunity to wrap the optional Error instance in an exception or create a new exception if no Error instance was provided. Thus, exception instances can be wrapped at each link in an asynchronous callback chain.

Note that there is a difference between the first asynchronous routine in a chain and the asynchronous routine that originates the error. By way of example, consider the following chain of asynchronous tasks: A ->B ->C. Async task "A" calls into async task "B" as part of its work, which calls into async task "C". The tasks start in the order A, B, C. Task "C" originates a failure and its rejection handler gets called with that failure (e.g., an Error instance). The rejection handler for task "C" wraps the failure reason as an exception and then rejects task "B" with the wrapped exception instance (because "C" is a required subtask of "B," and "C" failed). Then, the rejection handler for task "B" wraps the failure again with different data (type, message, area) and then rejects "A" with this wrapped exception instance (because "B" is a required subtask of "A").

In one or more implementations, the combination of the exception type hierarchy and the wrapping behavior creates a precedence order for exceptions and transforms a series of exceptions into one dominant exception instance. By way of example, consider an object being built that represents the current user's metadata. In this example, the object is created asynchronously because it makes some service calls to fetch data, so it makes an asynchronous callback when creation is complete. Thus, for example, the user object needs to make an authenticated service request to pull user metadata. If the service request fails it will originate a ServiceException instance. Then, the authentication routine that made the service request calls Authentication Exception.wrap(e), where 'e' is the object returned from the failing asynchronous service request callback (in this case 'e' represents a ServiceException instance). If as in FIG. 2 the calling type (AuthenticationException) is not an ancestor type of the argument type (ServiceException), calling Authentication Exception.wrap(e) creates and returns an instance of the calling type (AuthenticationException). Then, the authentication routine fails with the AuthenticationException instance. Finally, the object creation code is notified that an asynchronous callback failed with some error "e", so the object creation code calls Exception.wrap(e).

The object creation code does not know specifically which callback failed, so the object creation code calls the wrapping code with the generic base Exception type. In this case, 'e' represents an AuthenticationException instance, whereby calling Exception.wrap(e) preserves the AuthenticationException instance instead of returning a new base Exception object instance because the calling type (Exception) is an ancestor type of the argument type (AuthenticationException). The object creation code then invokes its failure callback with the preserved AuthenticationException instance returned from the Exception.wrap(e) call. Assuming there are no other asynchronous callbacks, the AuthenticationException instance then propagates to the exception manager, which maps it to an appropriate error dialog to show the user that authentication failed with a descriptive message and an appropriate recovery action. In this example, even though the AuthenticationException.wrap( ) call occurred in the middle of a chain of failures, the exception wrapping system preserved AuthenticationException as the dominant exception type due to the exception type hierarchy.

FIG. 3 shows example exception wrapping and propagation for the above example. In FIG. 3, the flow is represented by the circled numerals, described below:

1. Object creation code 332 makes an asynchronous call to authenticate.
2. Authentication code 334 makes an asynchronous service call.
3. Service Client code 336 sends an asynchronous request to a server 338 (e.g. via the HTTP protocol).
4. Server 338 returns an error (e.g., "403: Forbidden").
5. Service call rejection handler in the Service Client 336 (e.g., invoked as a callback) originates the error 'e' using ServiceException.new( ) which returns a new ServiceException instance.
6. Authentication rejection handler in the authentication code 334 wraps the ServiceException instance 'e' using Authentication Exception.wrap(e), which returns a new AuthenticationException instance because the calling type (AuthenticationException) is not an ancestor type of the argument type (ServiceException).
7. Object creation rejection handler in the object creation code 332 wraps the AuthenticationException instance 'e' using Exception.wrap(e), which preserves the AuthenticationException instance because the calling type (Exception) is an ancestor type of the argument type (AuthenticationException). The unhandled rejection callback for Object creation rejects with the AuthenticationException instance.
8. The Object creation rejection is not hooked by any parent task. Therefore, the Object creation rejection is an unhandled rejection and gets routed with its AuthenticationException instance to the global error handler 330.
9. The exception manager 114 maps the AuthenticationException to the appropriate text and recovery action to show in an authentication exception dialog (e.g., FIG. 6) and displays that dialog 318 to the user.

Calling Exception.wrap( )as is done numerous times in FIG. 3 returns an exception instance and can take either a native error instance or an exception instance as its argument.

Further note that a Dispatcher node 331 (shown as a dashed block to indicate a different error from the object creation error) also calls Exception.wrap(e) for an error case. Async tasks on the Dispatcher 331 are executed within a try/catch statement that catches errors and calls Exception.wrap(e) on the error ("e") and then sends this wrapped exception to the exception manager 114. This allows the Dispatcher 331 to quarantine the failing async call and to continue processing remaining async work items (to keep the application UI responsive and not frozen) while the error is being handled by the exception manager 114.

Figure 9:
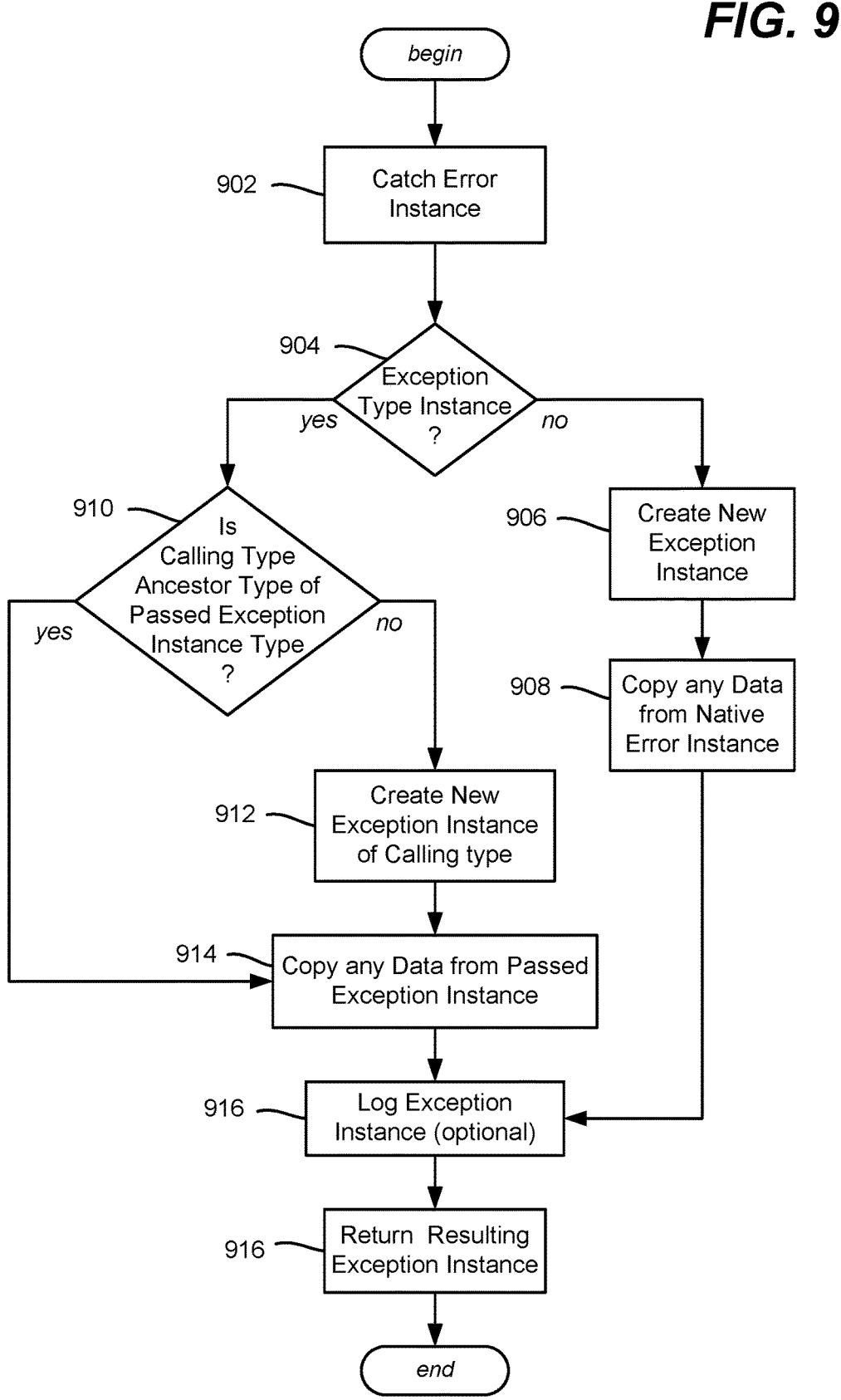
FIG. 9 is a flow diagram showing example steps related to determining an exception instance type based upon the most-derived applicable exception type in a hierarchy, according to one or more example implementations.

FIG. 9 represents general logic that may be implemented in the Exception.wrap( ) wrapping code, beginning at step 902 where a caught error is passed. If a native error instance is passed (step 904), then a new exception instance is created from the native error instance (step 906). If available, data from the native error instance is copied over to the new exception instance (e.g., message, callstack) at step 908 instead of creating it from scratch.

If instead at step 904 an exception instance is passed, then either a new exception instance is created to supersede the passed exception instance or the passed exception instance is preserved (depending on exception precedence as described herein, e.g., the hierarchy in FIG. 2). In other words, the more specific level in the hierarchy that applies to (is known for) that exception instance is used.

More particularly, Exception.wrap( )uses the exception type information (step 910) to determine whether to supersede or preserve the original exception instance when one is passed. Exception.wrap( ) is called with the desired exception type based on the context in the code where the Exception.wrap( ) call is made. For example, in an authenticated service request, a failing asynchronous service response is to be wrapped using AuthenticationException.wrap( ) because an AuthenticationException is desired here. When the calling type is not an ancestor type of the passed exception instance type, then a new exception instance is created of the calling type (step 912). Thus, calling AuthenticationException.wrap(serviceExceptionInstance) returns a new AuthenticationException because AuthenticationException is not an ancestor of service Exception Instance. In this example serviceExceptionInstancemay be of type ServiceException. Because AuthenticationException is not an ancestor of ServiceException, AuthenticationException.wrap(serviceExceptionInstance) creates an AuthenticationException that supersedes the passed base ServiceException instance. On the other hand, calling ServiceException.wrap (authenticationExceptionInstance) preserves the passed AuthenticationException instance because ServiceException is an ancestor of AuthenticationException. Note that regardless of whether a new exception instance is created or not, any data of the calling type may be copied and preserved at step 914. When creating a new instance, one alternative way to copy is to save the old instance as a property of the new instance and thereby preserve the prior data.

The Exception.wrap( ) logic generally may operate as in the example below:

```
// part of Exception.wrap( ) determining whether new instance will be
created
function wrap(TargetType, reason)
{
   if (reason instance of TargetType);
      return reason;
   else
      return TargetType.new(reason);
}
```

Thus, if calling AuthenticationException.wrap( ) and the reason already is an AuthenticationException, then no new instance is created. However, if calling AuthenticationException.wrap( ) and the reason refers to something higher (less specific) in the hierarchy, e.g., ServiceException, then a new instance of an Authentication Exception is created.

Exception.wrap( ) also may log data regarding the exception to internal log handlers as represented by example step 916. Note that different logging mechanisms may be invoked depending on the path taken in FIG. 9, in which event different logging steps may exist in each path. When an Exception.wrap( ) is called with an exception instance parameter, the passed exception instance's ID (at least) is preserved. Thus, to debug exceptions in the application, a developer can consult the exception logs and trace the flow of an exception through the code using the exception instance's ID. The exception logs can be transmitted from the application to a log aggregation service, for example.

With respect to exception propagation, errors can occur anywhere within an application and need to be funneled to the exception manager. Errors that occur while running work items may be caught by the dispatcher 331 (FIG. 3) and routed to the exception manager 114. Global error handling 330 exists to catch other errors because uncaught errors will likely crash the application.

Errors caught by the dispatcher 331 or global error handler 330 are routed to the exception manager 114 to show an appropriate exception dialog (although for errors that are ignored, the wrapping code may only log the error and handle it, that is, not re-throw or return it), and the exception manager may not be invoked). For example, if the application is running in a web browser, then the browser's error hook needs to be connected to the exception manager. In this case, the application process may hook the window.onerror event in one example implementation. In one or more implementations, the global error handling is a last resort for unexpected errors and exceptions that are thrown synchronously. For errors in dispatched work items, the dispatch mechanism that runs work items catches errors thrown by work items and passes them to the exception manager so as to allow other queued work items to continue running uninterrupted. Exception instances may be logged when they are handled by the global exception manager.

Figure 10:
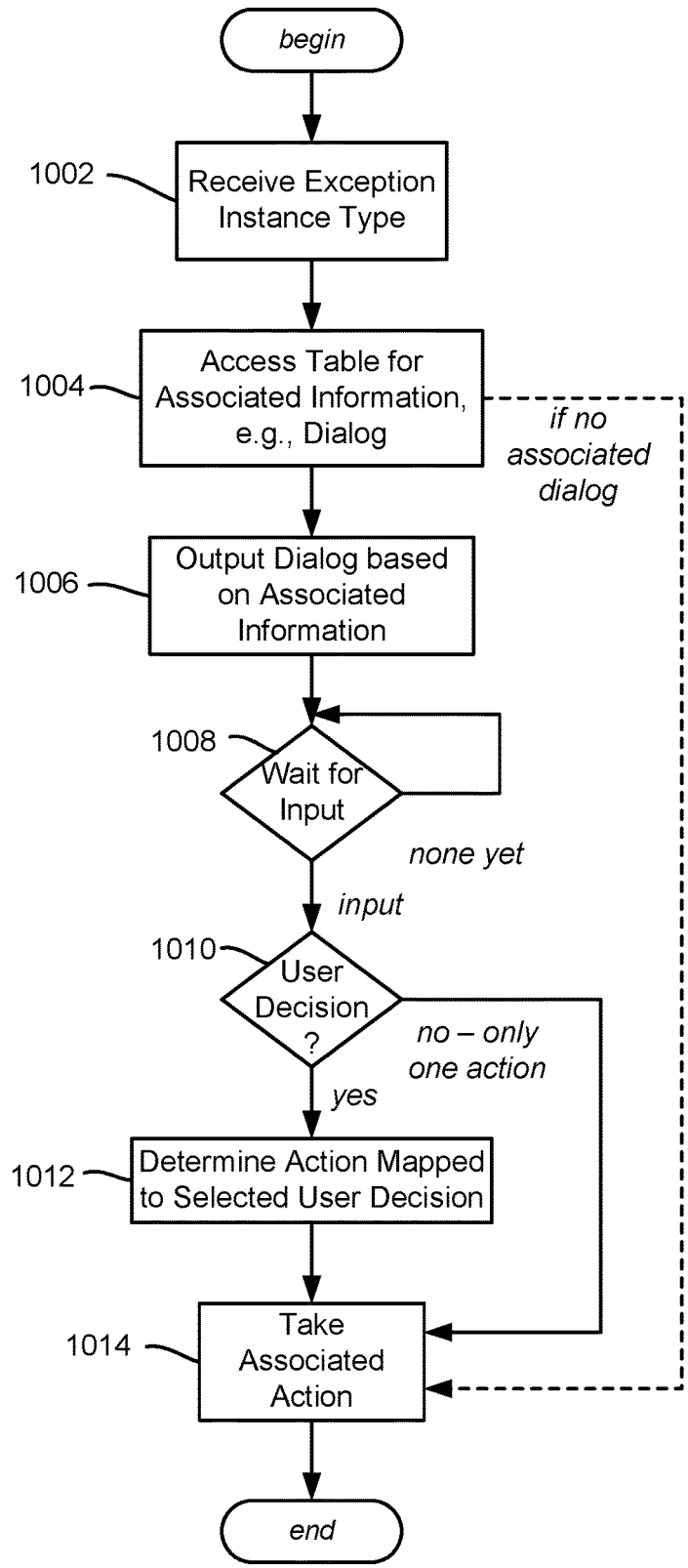
FIG. 10 is a flow diagram showing example steps related to handling an exception instance type inside of an exception manager, according to one or more example implementations.

FIG. 10 is a flow diagram showing example steps that may be taken by the exception manager, beginning at step 1002 where the exception manager receives the exception instance type.

Step 1004 represents accessing the exception type table, with step 1006 representing the outputting of the dialog associated with the type. Step 1008 waits for user input, (e.g., asynchronously via an event or the like rather than a loop as may be suggested in FIG. 10). Note that in a scenario in which an exception is able to reach the exception manager but does not have an associated dialog, the exception manager may simply take the default associated action, as represented by the dashed line from step 1004 to step 1014; however, in one or more implementations, there is a default dialog for this situation.

When input is received, step 1010 evaluates whether the user made a decision as to the type of action to be taken (e.g., there were multiple buttons from which to select), or, as in many situations, there was only one action associated with the exception and only awaited user acknowledgement (e.g., there was only a single button). If the dialog contains more than one possible action, step 1012 determines an action mapped to the user decision. Step 1014 takes the action related to the exception, e.g., restarts the program or navigates to some appropriate location in the program.

As can be seen, the wrapped exception handling system allows a complex application with an asynchronous architecture to define a precedence of exception types and provide centralized exception handling. The exception precedence system benefits end users by ultimately showing appropriate exception dialogs depending on the nature and context of an application failure. Logging during exception wrapping and propagation helps developers trace the origination and flow of exceptions in their code to track and isolate the bugs that cause exceptions for end users.

Calling Exception.wrap( ) for each failure in a async chain of failures with an appropriate type for the nature of the failure allows the current routine's rejection handler to not have to consider the problem of determining failure precedence. This is beneficial because determining failure precedence at the site where a failure occurs can be difficult if not impossible because the current routine may either be a primary task or a subtask, but the failure handling code for the current routine may not have enough context to decide which it is. Exception wrapping solves the precedence problem using the asynchronous call order and type hierarchy.

One or more aspects are directed towards wrapping code coupled to an error handler of a routine, in which the routine produces an error and the wrapping code wraps the error with relevant information to provide a wrapped exception instance. An exception type hierarchy is used to preserve information in the wrapped exception instance including an exception type An exception manager receives the wrapped exception instance and determines one or more actions to take based upon the exception type of the wrapped exception instance. The wrapped exception type may be derived from a higher-level exception type in the exception type hierarchy.

The exception manager may take the one or more actions, including to present an interactive dialog associated with the exception type. To this end, the exception manager may access an exception type table that associates exception types with dialogs to select the interactive dialog for the exception type. The dialog may include an interactive input mechanism, which when selected, results in the exception manager taking further action to restart a program that contains the routine, to navigate to a location in a program that contains the routine, in which the location is determined based upon information in the wrapped exception type, to navigate back to a prior location or retry an operation that caused the error.

Also described is an optional logging mechanism that logs data corresponding to the wrapped exception instance.

The wrapping code may be configured to determine if the error corresponds to a native error, and if so, to create a new exception instance and preserve at least some available data associated with the native error, if any, in the new exception instance. The wrapping code may be called with a calling exception type, and the wrapping code may determine if the calling exception type is an ancestor type of a passed exception instance type, and if so, to preserve the passed exception instance as the wrapped exception instance, and if not, to create a new exception instance corresponding to the calling exception type. The wrapping code may create a new exception instance type, and preserve at least some data of the passed exception instance type in the new exception instance type.

One or more aspects are directed towards receiving a call related to a program error, in which the call is associated with a passed native error instance or the call is associated with a passed exception instance and a calling exception type. Described is determining if the call corresponds to a passed exception instance, and if not, creating a new exception instance of the calling exception type to represent the program exception and preserving information corresponding to any data of the passed native error instance in the new exception instance. If the call corresponds to a passed exception instance, described is determining if the calling exception type is an ancestor type of the passed exception instance type, and if not, creating a new instance of the calling exception type to represent the program exception, or if so, preserving the passed exception instance to represent the program exception.

When the calling exception type is not an ancestor type of the passed exception instance type, information corresponding to data of the passed exception instance may be preserved in the new exception instance. Preserving the information may include maintaining the passed exception instance or at least some of the data of the passed exception instance as at least one property of the new exception instance.

When the calling exception type is an ancestor type of the passed exception instance type, information corresponding to data of the passed exception instance may be preserved in the wrapped exception instance that gets returned.

Data corresponding to the wrapped exception instance may be logged.

The exception instance may be received at an exception manager, which may output a dialog based upon the received exception instance type, and take a recovery action based upon the received exception instance type.

One or more aspects are directed towards determining a wrapped exception type based upon a hierarchy, including using a wrapped exception type that applies to an error thrown while executing a program, rrouting the wrapped exception instance to an exception manager, determining a dialog and associated with the wrapped exception instance type, outputting the dialog and taking action based upon user interaction with the dialog.

Determining the exception instance type may include determining if a calling exception type is an ancestor type of a passed exception instance type, and if so, preserving the passed exception instance as the wrapped exception instance, and if not, creating a new exception instance corresponding to the calling exception type. Taking the action may include restarting the program, navigating to a location in the program, navigating back to a prior location, or retrying an operation that caused the error.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 11 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 11:
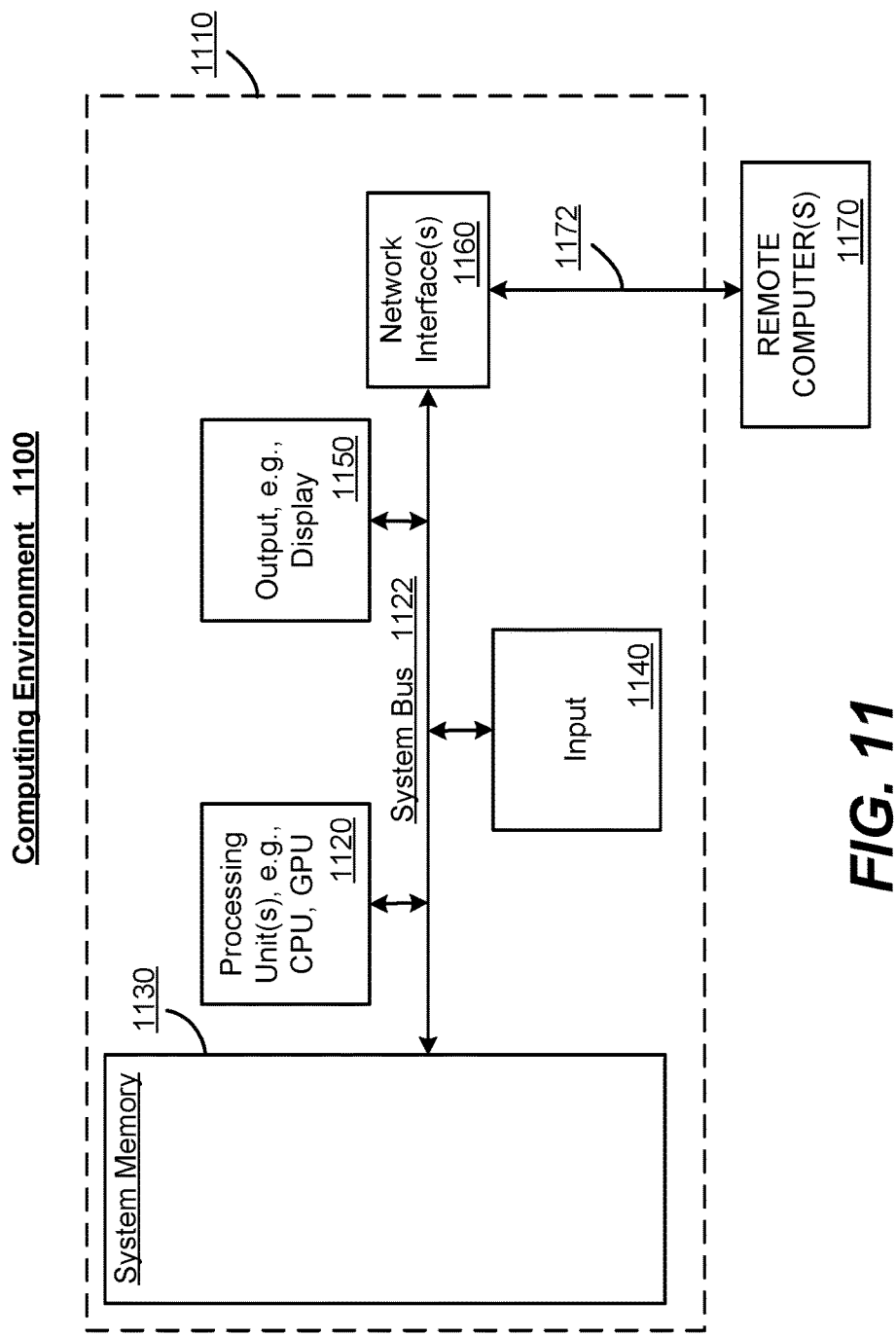
FIG. 11 is a block diagram representing an example computing environment into which aspects of the subject matter described herein may be incorporated.

FIG. 11 thus illustrates an example of a suitable computing system environment 1100 in which one or aspects of the implementations described herein can be implemented, although as made clear above, the computing system environment 1100 is only one example of a suitable computing environment and is not intended to suggest any limitation as to scope of use or functionality. In addition, the computing system environment 1100 is not intended to be interpreted as having any dependency relating to any one or combination of components illustrated in the example computing system environment 1100.

With reference to FIG. 11, an example device for implementing one or more implementations includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 typically includes a variety of machine (e.g., computer) readable media and can be any available media that can be accessed by a machine such as the computer 1110. The system memory 1130 may include computer storage media in the form of volatile and/or nonvolatile memory such as read only memory (ROM) and/or random access memory (RAM), and hard drive media, optical storage media, flash media, and so forth. By way of example, and not limitation, system memory 1130 may also include an operating system, application programs, other program modules, and program data.

A user can enter commands and information into the computer 1110 through one or more input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art.

Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system comprising:
   wrapping code coupled to an error handler of a routine, in which the routine produces an error and the wrapping code wraps the error with relevant information to provide a wrapped exception instance, including to use an exception type hierarchy to preserve information in the wrapped exception instance including an exception type, and wherein the wrapped exception instance comprises a single exception instance transformed from a series of errors; and
   an exception manager that receives the wrapped exception instance and determines one or more actions to take based upon the exception type of the wrapped exception instance.

2. The system of claim 1 wherein the wrapped exception type is derived from a higher-level exception type in the exception type hierarchy.

3. The system of claim 1 wherein the exception manager takes the one or more actions, including to present an interactive dialog associated with the exception type.

4. The system of claim 3 wherein the exception manager accesses an exception type table that associates exception types with dialogs to select the interactive dialog for the exception type.

5. The system of claim 3 wherein the dialog includes an interactive input mechanism, which when selected, results in the exception manager taking further action to navigate to a location in a program that contains the routine, in which the location is determined based upon information in the wrapped exception type.

6. The system of claim 3 wherein the exception manager accesses an exception type table that associates exception types with dialogs to select the interactive dialog for the exception type.

7. The system of claim 3 wherein the dialog includes an interactive input mechanism, which when selected, results in the exception manager taking further action to navigate to a location in a program that contains the routine, in which the location is determined based upon information in the wrapped exception type.

8. The system of claim 1 further comprising a logging mechanism that logs data corresponding to the wrapped exception instance.

9. The system of claim 1 wherein the wrapping code is configured to determine if the error corresponds to a native error, and if so, to create a new exception instance and preserve at least some available data associated with the native error, if any, in the new exception instance.

10. The system of claim 1 wherein the wrapping code is called with a calling exception type, and wherein the wrapping code determines if the calling exception type is an ancestor type of a passed exception instance type, and if so, to preserve the passed exception instance as the wrapped exception instance, and if not, to create a new exception instance corresponding to the calling exception type.

11. The system of claim 10 wherein the wrapping code creates a new exception instance type, and wherein the wrapping code is further configured to preserve at least some data of the passed exception instance type in the new exception instance type.

12. The system of claim 10 wherein the wrapping code creates a new exception instance type, and wherein the wrapping code is further configured to preserve at least some data of the passed exception instance type in the new exception instance type.

13. The system of claim 1 wherein the wrapped exception instance corresponds to one link in an asynchronous callback chain.

14. The system of claim 1 wherein the wrapped exception type is derived from a higher-level exception type in the exception type hierarchy.

15. The system of claim 1 wherein the exception manager takes the one or more actions, including to present an interactive dialog associated with the exception type.

16. The system of claim 1 further comprising a logging mechanism that logs data corresponding to the wrapped exception instance.

17. The system of claim 1 wherein the wrapping code is configured to determine if the error corresponds to a native error, and if so, to create a new exception instance and preserve at least some available data associated with the native error, if any, in the new exception instance.

18. The system of claim 1 wherein the wrapping code is called with a calling exception type, and wherein the wrapping code determines if the calling exception type is an ancestor type of a passed exception instance type, and if so, to preserve the passed exception instance as the wrapped exception instance, and if not, to create a new exception instance corresponding to the calling exception type.

19. The system of claim 1 wherein the wrapped exception instance comprises a single exception instance transformed from a series of errors.

20. A system comprising:
   wrapping code coupled to an error handler of a routine, in which the routine produces an error and the wrapping code wraps the error with relevant information to provide a wrapped exception instance, including to use an exception type hierarchy to preserve information in the wrapped exception instance including an exception type, and wherein the wrapped exception instance corresponds to one link in an asynchronous callback chain; and
   an exception manager that receives the wrapped exception instance and determines one or more actions to take based upon the exception type of the wrapped exception instance.

* * * * *